US012497163B1

(12) United States Patent
Vincent

(10) Patent No.: US 12,497,163 B1
(45) Date of Patent: Dec. 16, 2025

(54) ROTARY TOGGLE MECHANISM FOR LANDING GEAR SYSTEM

(71) Applicant: American Honda Motor Co., Inc, Torrance, CA (US)

(72) Inventor: Aaron John Vincent, Kernersville, NC (US)

(73) Assignee: AMERICAN HONDA MOTOR CO., INC., Torrance, CA (US)

( * ) Notice: Subject to any disclaimer, the term of this patent is extended or adjusted under 35 U.S.C. 154(b) by 0 days.

(21) Appl. No.: 18/743,387

(22) Filed: Jun. 14, 2024

(51) Int. Cl.
| | | |
|---|---|---|
| G05G 7/00 | (2006.01) | |
| B64C 25/20 | (2006.01) | |
| B64C 25/30 | (2006.01) | |
| G05G 5/06 | (2006.01) | |

(52) U.S. Cl.
CPC .............. B64C 25/30 (2013.01); B64C 25/20 (2013.01); G05G 5/06 (2013.01); G05G 7/00 (2013.01); *G05G 2505/00* (2013.01)

(58) Field of Classification Search
CPC .......... B64C 25/20; B64C 25/30; G05G 5/06; G05G 7/00; G05G 2505/00
USPC ........ 74/110, 55, 54, 579 R, 503; 244/100 R
See application file for complete search history.

(56) References Cited

U.S. PATENT DOCUMENTS

| | | | |
|---|---|---|---|
| 2,389,220 A | * | 11/1945 | Tredeau ............... H01H 23/141 74/503 |
| 8,714,480 B2 | | 5/2014 | Prud'Homme-Lacroix et al. |
| 9,102,402 B2 | | 8/2015 | Dubois |
| 9,102,403 B2 | | 8/2015 | Filho |
| 10,086,924 B2 | | 10/2018 | Crandall-Seibert et al. |
| 10,559,438 B2 | | 2/2020 | Moonamkandy et al. |
| 11,299,256 B2 | | 4/2022 | Hunter et al. |
| 11,673,655 B2 | | 6/2023 | Patel |
| 2023/0392659 A1 | | 12/2023 | Putz et al. |

FOREIGN PATENT DOCUMENTS

| | | |
|---|---|---|
| CN | 209617521 U | 11/2019 |
| CN | 213892878 U | 8/2021 |
| EP | 3945019 A1 | 2/2022 |

* cited by examiner

*Primary Examiner* — T. Scott Fix
(74) *Attorney, Agent, or Firm* — Plumsea Law Group, LLC

(57) ABSTRACT

Systems for activating and deactivating an emergency landing gear system in an aircraft include a rotary toggle mechanism that actuates a switch. When the switch is actuated, the emergency landing gear system is activated and the operation of one or more other aircraft systems may be modified accordingly. The rotary toggle mechanism may be placed in three different states: a ready state, an active state, and a reset state. In the ready state, the switch is not actuated and the emergency landing gear system is not activated. In the active state the switch is actuated and the emergency landing gear system is activated. While the mechanism is in the active state the mechanism cannot be returned to the ready state without first passing through the reset state.

20 Claims, 15 Drawing Sheets

ROTARY TOGGLE MECHANISM FOR LANDING GEAR SYSTEM

BACKGROUND

The embodiments relate generally to toggle mechanisms, and in particular to toggle mechanisms used with aircraft.

Aircraft use landing gear for taxiing, take off, and landing. Landing gear may comprise retractable wheels. Aircraft may employ an emergency landing gear system that provides redundancy for deploying landing gear in the case that primary landing gear systems fail during flight. A free-fall or gravity drop system uses gravity to deploy the landing gear into the down and locked position. The system may be activated manually from the cockpit by a pilot or co-pilot.

Once the free-fall or gravity drop system has been activated, it is important to ensure a pilot remains continuously aware of the state of the system, since the operation of other aircraft systems may be modified by the engagement of this system.

There is a need in the art for a system and method that addresses the shortcomings discussed above.

SUMMARY

Embodiments provide systems for activating and deactivating an emergency landing gear system in an aircraft.

In some aspects, the techniques described herein relate to a rotary toggle mechanism, including: a housing including a housing slot with a main slot portion and a slot detent; a cam secured to the housing such that the cam is rotatable direction relative to the housing in a first rotational direction and a second rotational direction opposite the first rotational, the cam including a cam detent; a locking pin extending through the housing slot; wherein the rotary toggle mechanism has a first state where the locking pin is secured between the cam and the main slot portion of the housing slot; wherein the rotary toggle mechanism has a second state where the locking pin is disposed in the cam detent, wherein the second state is reached by rotating the cam in the first rotational direction from the first state, and wherein the cam is prevented from rotating in the second rotational direction while the rotary toggle mechanism is in the second state; wherein the rotary toggle mechanism has a third state where the locking pin is disposed in the slot detent, wherein the third state is reached by rotating the cam in the first rotational direction from the second state, and wherein the cam is rotated in the second rotational direction from the third state to the first state.

In some aspects, the techniques described herein relate to an assembly, including: a lever including a first end and a second end; a handle attached to the first end of the lever; a rotary toggle mechanism associated with the second end of the lever; wherein the rotary toggle mechanism has three different states corresponding to three different positions of the handle.

In some aspects, the techniques described herein relate to a system for controlling an emergency landing gear system in an aircraft, the system including: a switch having an actuated position in which the emergency landing gear system is activated and a non-actuated position in which the emergency landing gear system is deactivated; a rotary toggle mechanism for changing the switch between the actuated position and the non-actuated position; a lever for controlling the rotary toggle mechanism; and a handle connected to the lever, wherein the handle is configured to be accessible by a pilot of the aircraft.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Embodiments provide systems for activating and deactivating an emergency landing gear system in an aircraft. The systems may include a rotary toggle mechanism that actuates a switch. When the switch is actuated, the emergency landing gear system is activated and the operation of one or more other aircraft systems may be modified accordingly. The rotary toggle mechanism may be placed in three different states: a ready state, an active state, and a reset state. In the ready state, the switch is not actuated and the emergency landing gear system is not activated. In the active state the switch is actuated and the emergency landing gear system is activated. While the mechanism is in the active state the mechanism cannot be returned to the ready state without first passing through the reset state.

The state of the mechanism may be controlled by a pilot or co-pilot by manipulating a handle that is connected to the mechanism by way of a lever. In the ready state the handle has a first position, referred to as a retracted position of the handle. To change the mechanism to the active state, the pilot pulls on the handle until the handle is extended to a second position, referred to as a first extended position, at which point the emergency landing gear system is activated. The handle may be locked in place at the first extended position. Locking the handle in place in the extended position provides a visual cue to the pilot about the state of the emergency landing gear system.

When the pilot wants to deactivate the emergency landing gear system, the pilot pulls the handle further in the same direction until the handle reaches a third position, referred to as a second extended position, which has the effect of resetting the mechanism so that the mechanism may be returned to the ready state. As the handle is allowed to retract following the reset state, the mechanism returns to the ready state and the switch is no-longer actuated, which deactivates the emergency landing gear system.

In some embodiments, the rotary toggle mechanism includes a cam with a detent, a locking pin fork, a locking pin and a housing with a slot. The components are arranged such that the mechanism takes on at least the three different states, which may also be identified with different positions of the individual components. For example, the three states of the mechanism may also be identified with three different angular positions of the cam, as well as three different positions of the locking pin. As discussed in further detail below, when the locking pin is moved into the detent of the cam, the mechanism is in the active state and prevented from directly returning to the ready state. Likewise, when the locking pin is moved into a detent of the housing slot, the mechanism is in the reset state and the mechanism may return to the ready state.

Figure 1:
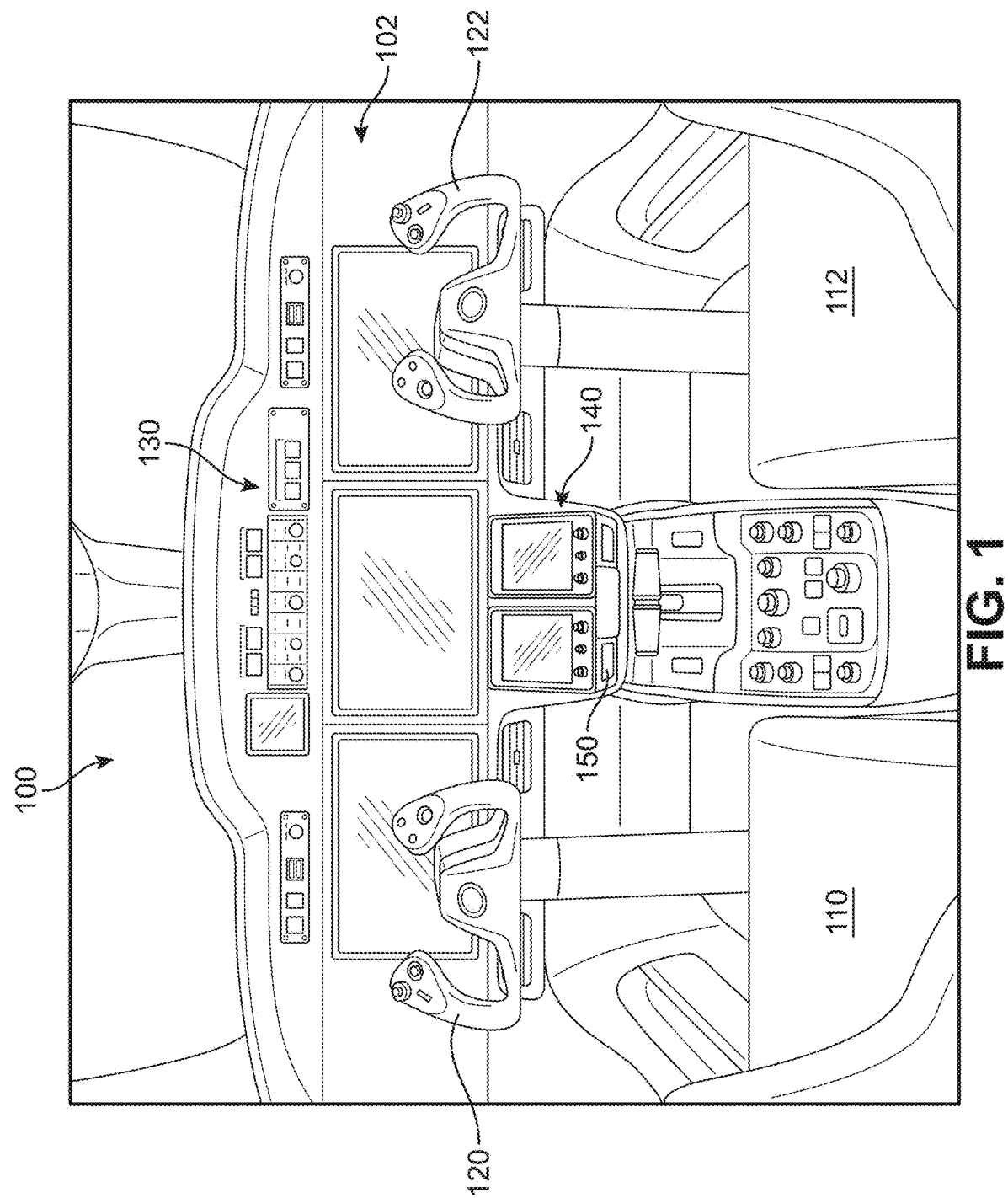
FIGS. 1-3 are schematic views of portions of an aircraft cockpit, according to an embodiment.
Figure 2:
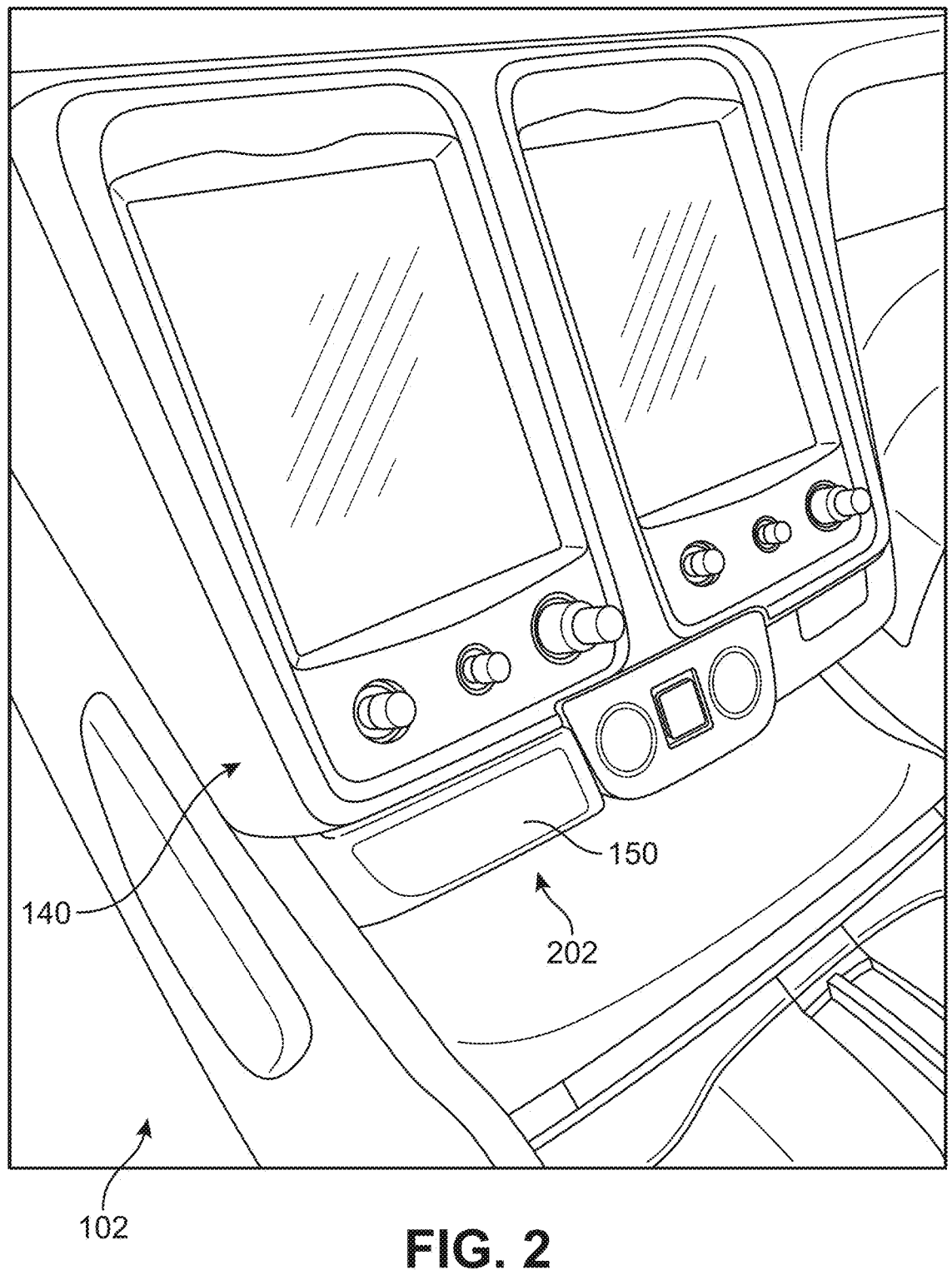
Figure 3:
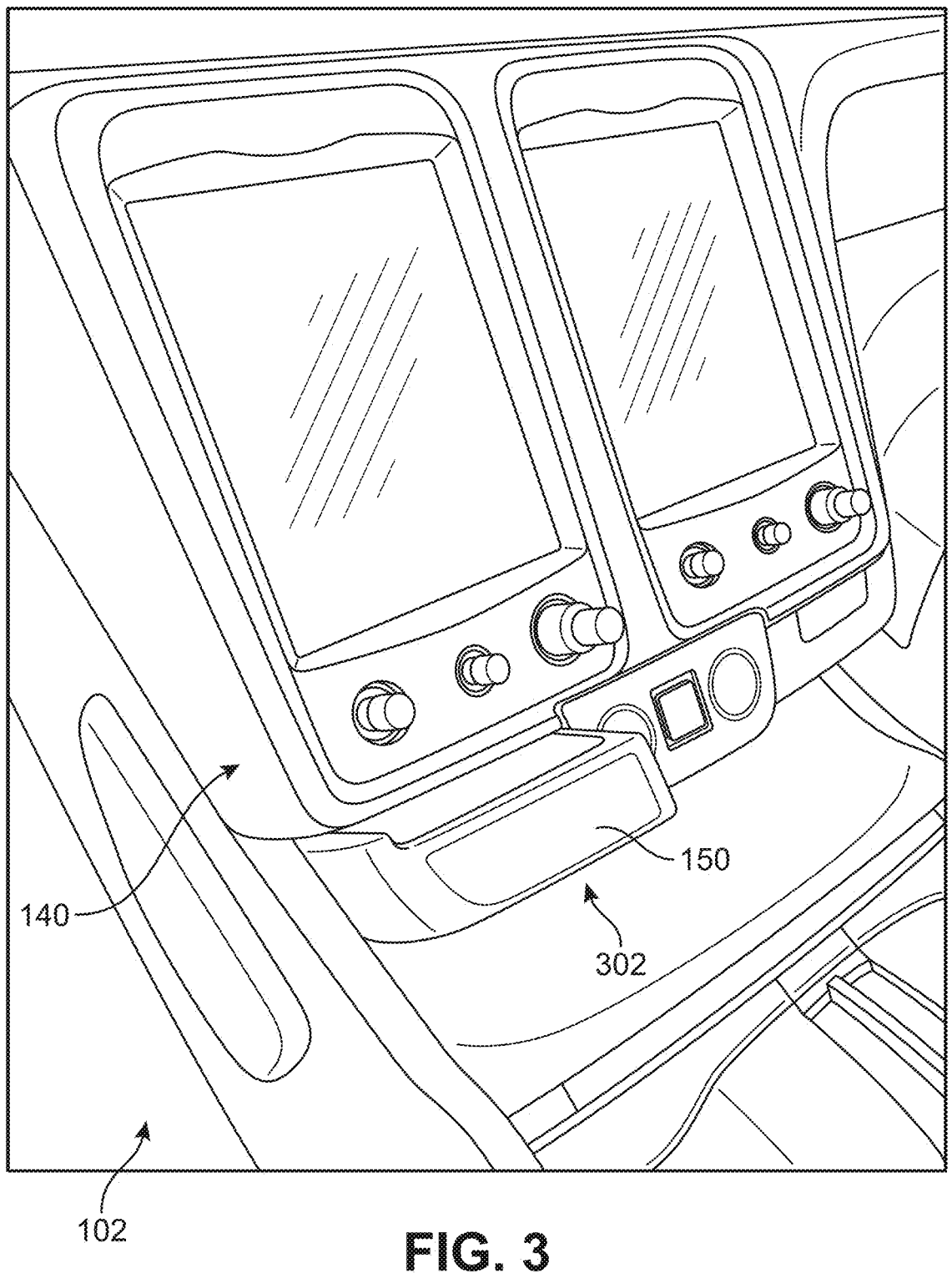

For purposes of introduction, FIGS. 1-3 depict schematic views of portions of an aircraft cockpit. Referring first to FIG. 1, a cockpit 102 for an aircraft 100 is shown. Cockpit 102 includes a pair of seats (first seat 110 and second seat 112) and corresponding pair of flight controls (first flight controller 120 and second flight controller 122), which may be used by a pilot and co-pilot, respectively. Cockpit 102 also includes various instrument and control panels 130.

As discussed, aircraft may include backup systems that facilitate deploying landing gear in the event that the primary landing gear extension systems fail during a flight. In some embodiments, aircraft 100 utilizes an emergency landing gear free-fall system that uses gravity to allow the landing gear to drop during flight. In some cases, an emergency landing gear free-fall system may be activated manually by a pilot or co-pilot.

Referring to FIGS. 2-3, an enlarged view of a central portion 140 of instrument and control panels 130, cockpit 102 may include a handle 150 that may be actuated by a pilot or co-pilot. Handle 150 may be connected to a mechanism that activates (and deactivates) the emergency landing gear system of aircraft 100.

In FIG. 2, handle 150 may be in a retracted position 202. As discussed in further detail below this position for handle 150 corresponds to a 'ready' state (or configuration) of an associated toggle mechanism. In the ready state (also referred to as a 'start' state), the emergency landing gear system is not engaged.

In some cases, retracted position 202 corresponds to a position where handle 150 is substantially flush with adjacent panels, instruments, and/or controls of central portion 140. In this position, therefore, handle 150 may not draw the pilot's attention and may tend to blend in with adjacent controls and instruments.

Activation of the emergency landing gear system occurs when a pilot or co-pilot pulls on handle 150, which places handle 150 in an extended position, relative to other adjacent panels, instruments and controls of cockpit 102. As the pilot pulls handle 150 by a suitable distance, handle 150 reaches extended position 302, as in FIG. 3. Extended position 302 of handle 150 corresponds to an 'active' state (or configuration) of the associated rotary toggle mechanism. In this active state, the emergency landing gear system is engaged.

To ensure that the pilot can easily ascertain that the emergency landing gear system has been engaged, handle 150 does not return to its default or retracted position, but stays locked in extended position 302. By maintaining handle 150 in a position that extends substantially beyond the surfaces of the other controls and instruments, the pilot has a constant visual reminder that the emergency landing gear system is engaged.

Returning the system to the ready state requires that a pilot pull on handle 150 so that it extends further than extended position 302 shown in FIG. 3. As handle 150 is further extended, the toggling mechanism controlling the position of handle 150 is reset, and this allows handle 150 to be returned to retracted position 202 of FIG. 2. Moreover, once handle 150 is returned to the retracted position, the associated toggle mechanism returns to the ready state. This has the effect of deactivating the emergency landing gear system.

Figure 4:
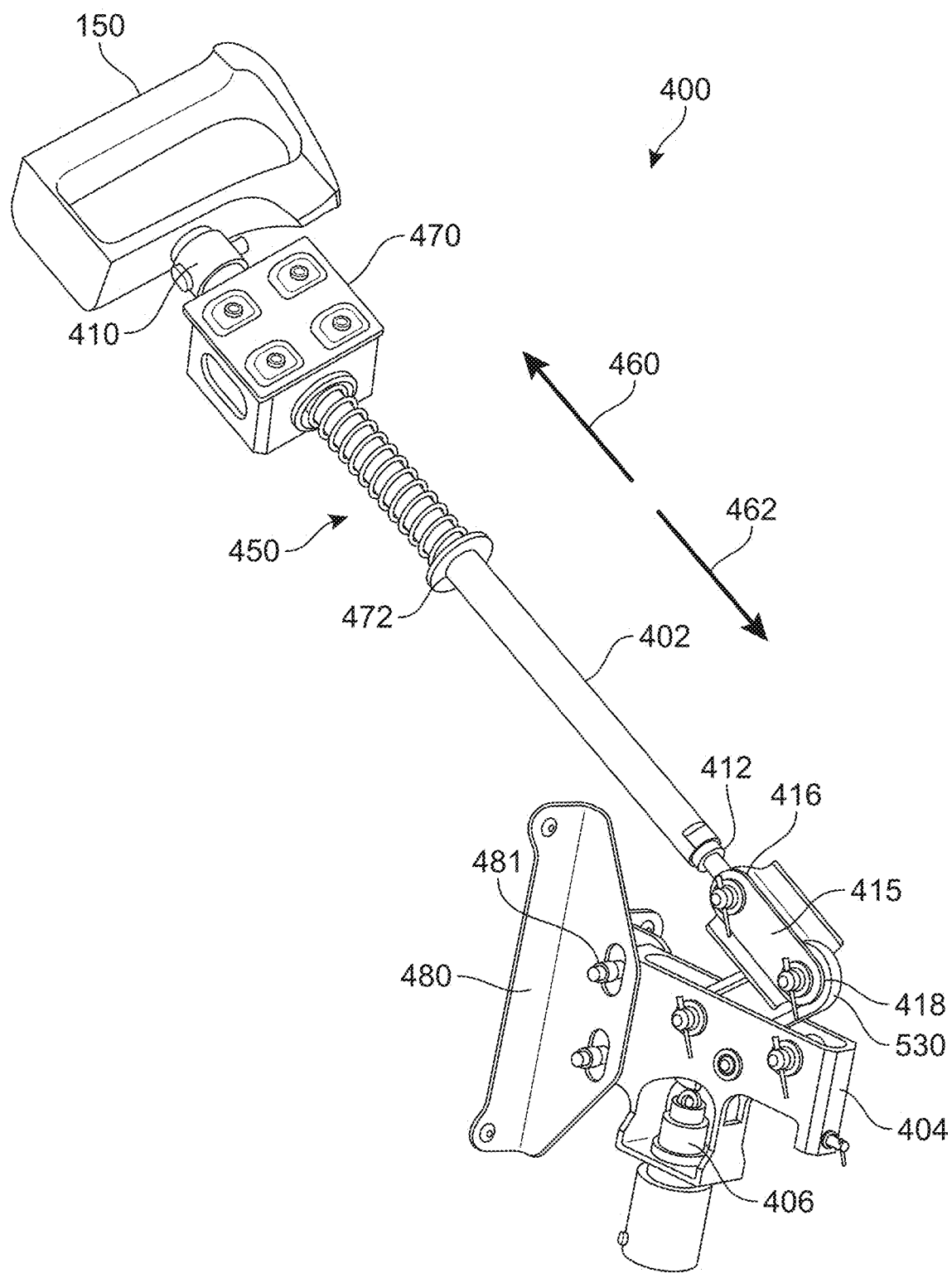
FIG. 4 is a schematic view of an assembly that may be used to activate and deactivate an emergency landing gear system in an aircraft, according to an embodiment.

FIG. 4 is a schematic view of an assembly 400 that may be used to activate and deactivate an emergency landing gear system in an aircraft. Referring to FIG. 4, assembly 400 includes, at one end, handle 150 that may be accessible from within a cockpit. Handle 150 may be connected, by way of a lever 402, to a rotary toggle mechanism 404. Rotary toggle mechanism 404 may be further connected to a switch 406. Switch 406 may be positioned in an actuated position (or state) and a non-actuated position (or state). When switch 406 is in an actuated state, the emergency landing gear system in the aircraft is activated/engaged. When switch 406 is in the non-actuated state, the emergency landing gear system in the aircraft is deactivated/disengaged. Thus, handle 150 may be used, by way of lever 402 and rotary toggle mechanism 404, to control the state of switch 406, and thus the state of the emergency landing gear system for the aircraft.

Handle 150 may attach to a first end 410 of lever 402. A second end 412 of lever 402 may be connected to rotary toggle mechanism 404 by way of a linkage 415. In particular, a first portion 416 of linkage 415 connects to second end 412 of lever 402, while a second portion 418 of linkage 415 connects to a cam 530 of rotary toggle mechanism 404. As lever 402 is extended and retracted along a linear axis parallel with its length, lever 402 (with linkage 415) rotates cam 530 which may engage switch 406, as discussed in further detail below.

When assembly 400 is disposed in an aircraft, a component 470 of assembly 400 that retains a portion of lever 402 may be attached to adjacent components of the aircraft and fixed in place with respect to those components. Likewise, a bracket 480 connected with rotary toggle mechanism 404 may be attached and fixed in place. With component 470 and bracket 480 fixed in place, lever 402 (and handle 150) may move relative to component 470 and bracket 480. Likewise, components of rotary toggle mechanism 404 may also move as lever 402 moves.

Lever 402 and handle 150 may be translated along a first linear direction 460 and a second linear direction 462 that is opposite of first linear direction 460. As seen in FIG. 4, first linear direction 460 and second linear direction 462 may be parallel with a length of lever 402 (that is, parallel with a longitudinal axis of lever 402).

In some embodiments, a spring 450 may be used to bias lever 402 so that handle 150 remains in a retracted position when no pulling force is applied to handle 150 (for example, by a pilot). For example, as handle 150 is pulled in the first linear direction 460, spring 450 may be compressed between component 470 and a retaining ring 472 of lever 402, thereby generating the biasing force that works against translation in the first linear direction 460.

Figure 5:
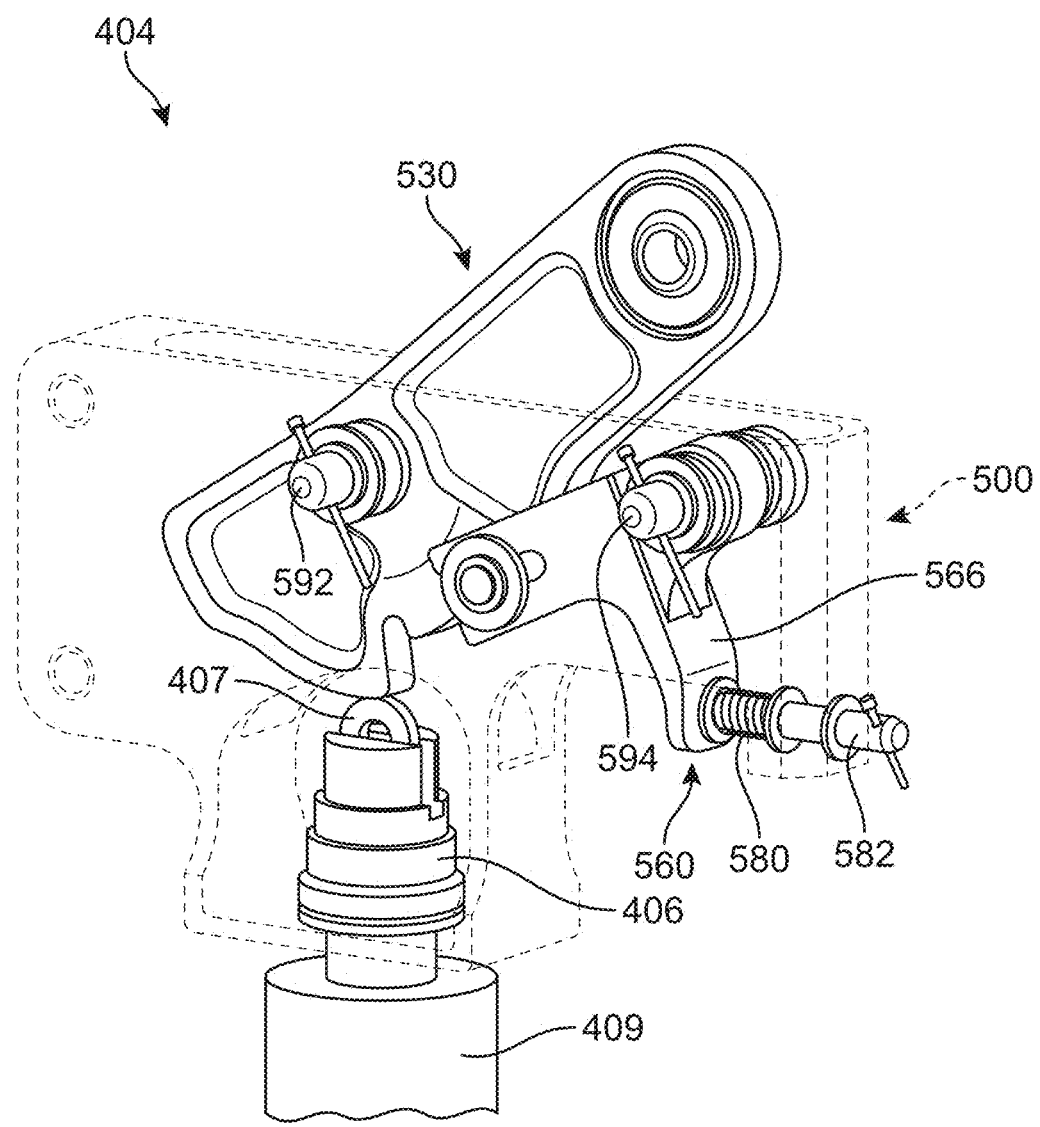
FIG. 5 is a schematic view depicting an assembled view of components of a rotary toggle mechanism, according to an embodiment.

FIG. 5 is a schematic view depicting an assembled view of components of rotary toggle mechanism 404. Referring to FIG. 5 rotary toggle mechanism 404 (or simply "mechanism 404") comprises a housing 500, a cam 530, a locking pin fork 560, and a locking pin 570 (shown in FIG. 6), as well as other components. For purposes of illustration, housing 500 of rotary toggle mechanism 404 is shown in phantom.

Cam 530 may be rotated withing housing 500 using lever 402 (see FIG. 4). In some states, cam 530 is rotated to lower/press a plunger 407 on switch 406. The states of mechanism 404, including allowable rotational positions for cam 530, are further controlled using locking pin 570, locking pin fork 560 and the profile of cam 530.

Figure 6:
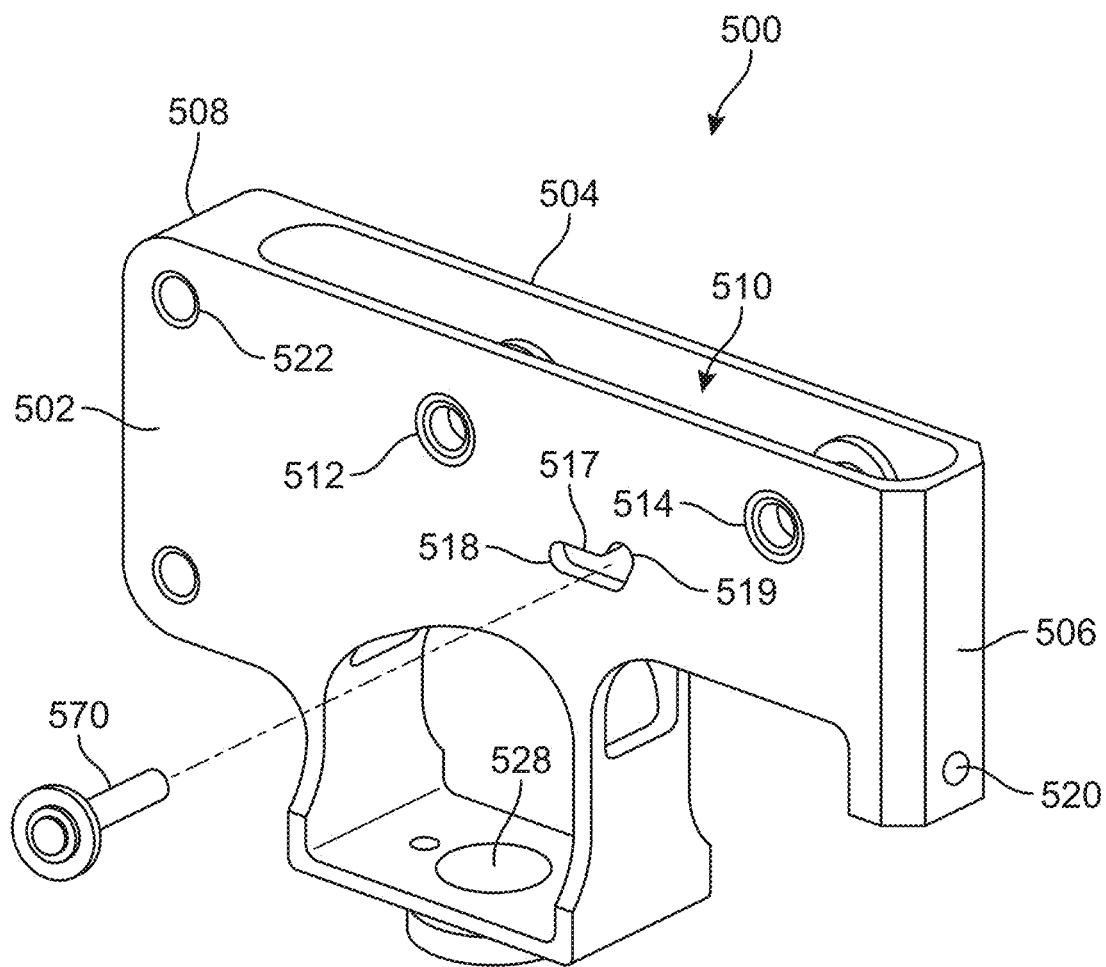
FIG. 6 is an isolated view of a housing and locking pin of a rotary toggle mechanism, according to an embodiment.

FIG. 6 is an isolated view of housing 500 and locking pin 570. As best seen in FIG. 6, housing 500 further comprises a first sidewall 502, a second sidewall 504, a front wall 506 and a rear wall 508. Housing 500 further includes an interior cavity 510 that retains several components of mechanism 404. Additionally, housing 500 includes openings in first sidewall 502 and second sidewall 504 to receive fasteners for securing other components of mechanism 404. For example, first sidewall 502 and second sidewall 504 include a first set of openings 512 and a second set of openings 514 for fastening cam 530 and locking pin fork 560, respectively, to housing 500.

Housing 500 further includes a set of slots disposed in first sidewall 502 and second sidewall 504 for receiving locking pin 570. The set of slots may include a first housing slot 517 on first sidewall 502 and a corresponding second slot (not shown), which is disposed on second sidewall 504. Each of the housing slots comprises a main slot portion and a detent. For example, first housing slot 517 includes a main slot portion 518 and a slot detent 519.

In some embodiments, housing 500 may include additional openings, for example, an opening 520 on front wall 506 for retaining a component for mounting a spring, and a plurality of openings 522 for receiving fasteners to mount rotary toggle mechanism 404 to other components of an aircraft. For example, plurality of openings 522 may receive fasteners 481 that may be used to attach housing 500 to bracket 480 (see FIG. 4). In some embodiments, housing 500 includes a large opening 528 associated with switch 406. In some cases, switch 406 is mounted to housing 500 at large opening 528.

Figure 7:
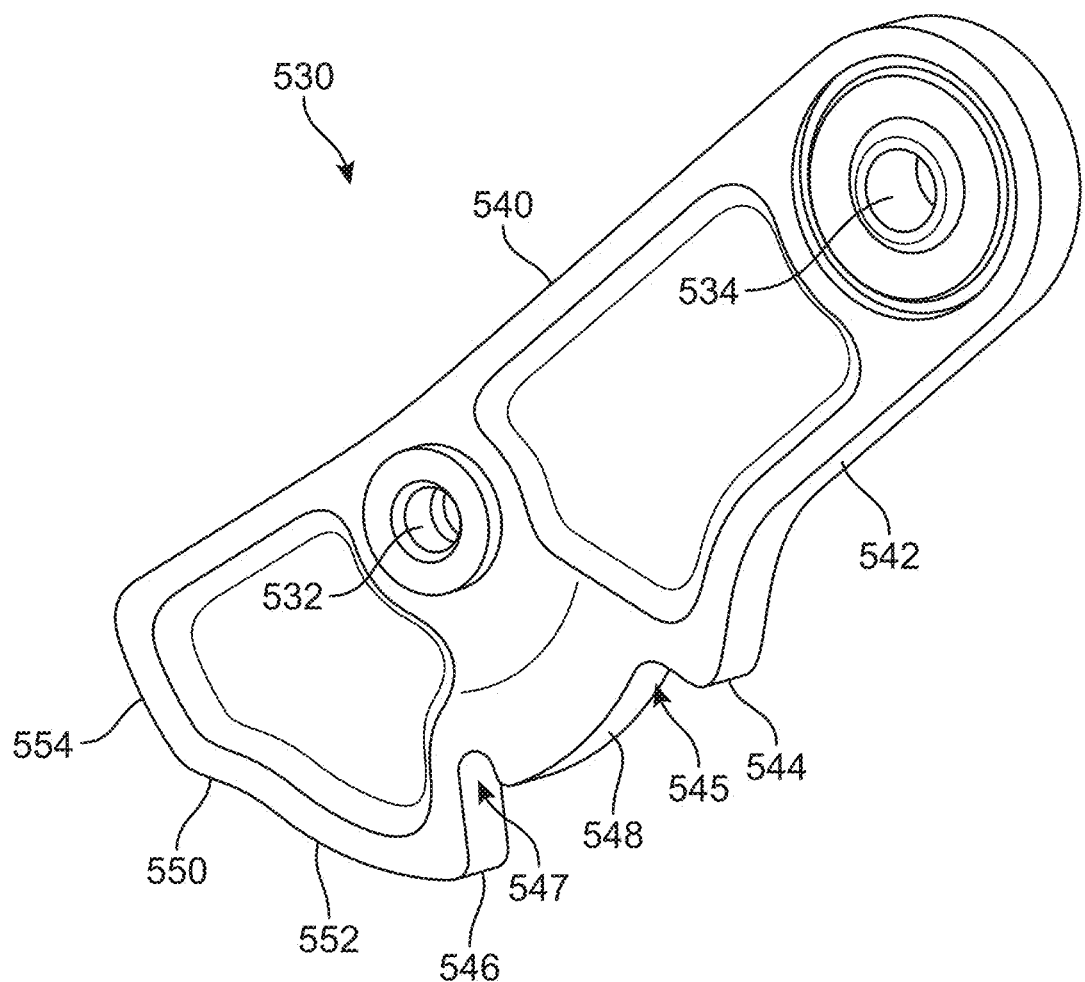
FIG. 7 is an isolated view of a cam of a rotary toggle mechanism, according to an embodiment.

FIG. 7 is an isolated view of cam 530. As seen in FIG. 7, cam 530 comprises a first opening 532 and a second opening 534. First opening 532 may be used to connect cam 530 with housing 500 in a rotatable manner, while second opening 534 connects cam 530 with linkage 415 of assembly 400.

Cam 530 may also include a profile or periphery. The shape of the periphery determines how cam 530 may interact with different components of mechanism 404 as cam 530 rotates to different positions about an axis through first opening 532. Different portions of the periphery may have an irregular shape, including portions that extend outwardly, or are convex in geometry, and portions that extend inwardly, or are concave in geometry. Different portions of the cam profile may be used to drive locking pin 570 to different positions of the housing slots, as well as to retain locking pin 570 and lock rotation of cam 530.

The periphery of cam 530 may be characterized as having an upper peripheral portion 540 with minimal curvature and a lower peripheral portion 542 with both protrusions and recesses. Lower peripheral portion 542 may include a first protruding portion 544 and a second protruding portion 546. An intermediate curved portion 548 between first protruding portion 544 and second protruding portion 546 is shaped to form a smaller recessed portion 545 adjacent first protruding portion 544 and a more extreme recessed portion, or detent 547, adjacent second protruding portion 546. As described in further detail below, for at least some positions of mechanism 404, locking pin 570 moves along (is guided by) lower peripheral portion 542 of cam 530 between first protruding portion 544 and second protruding portion 546, including into and out of detent 547.

In addition to a profile/periphery that interfaces with locking pin 570, a peripheral end portion 550 of cam 530 may interact with switch 406. In particular, peripheral end portion 550 includes a first portion 552 with a first curvature, and a second portion 554, with a second curvature that is different from the first curvature. These differently curved portions are configured to interact differently with switch 406 as cam 530 rotates. In some cases, an average radial distance between opening 532 and first portion 552 is less than an average radial distance between opening 532 and second portion 554, so that cam 530 applies little to no downward force on plunger 407 while plunger 407 is in contact with first portion 552 and cam 530 applies a sufficient downward force to push down plunger 407 when plunger 407 is in contact with second portion 554.

Figure 8:
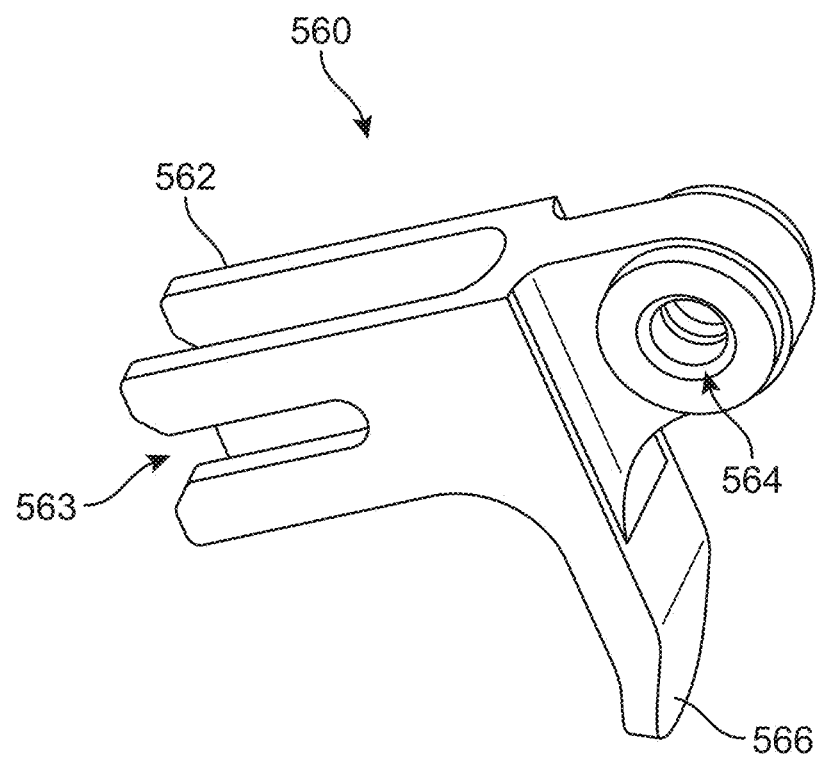
FIG. 8 is an isolated view of locking pin fork of a rotary toggle mechanism, according to an embodiment.

FIG. 8 is an isolated view of locking pin fork 560. Locking pin fork 560 includes a locking pin engaging portion 562 and a spring pin engaging portion 566. Locking pin engaging portion 562 includes a locking pin slot 563 that is sized to fit locking pin 570. Spring pin engaging portion 566 engages spring pin 582 (see FIG. 5) when spring pin 582 is fastened to housing 500. Locking pin fork 560 may also include an opening 564 that allows locking pin fork 560 to be fastened to housing 500 in a rotatable manner.

Referring back to FIGS. 5-8, one or more fasteners may be used to connect components to housing 500 and/or to one another. A first fastener 592 may extend through first set of openings 512 of housing 500 and through first opening 532 of cam 530 (see FIGS. 6 and 7). This configuration allows cam 530 to pivot or rotate about an axis parallel with the length of first fastener 592.

A second fastener 594 may extend through second set of openings 514 of housing 500 and through opening 564 of locking pin fork 560 (see FIGS. 6 and 8). This configuration allows locking pin fork 560 to pivot or rotate about an axis parallel with the length of second fastener 594.

A spring pin 582 may be fastened through opening 520 of housing 500 to retain spring 580. As seen in FIG. 5, spring 580 biases spring pin 582 against spring pin engaging portion 566 of locking pin fork 560, which biases the rotation of locking pin fork 560. Together, spring pin 582 and spring 580 may comprise a spring pin assembly.

Locking pin 570 may be disposed through the set of slots in housing 500 (including slot 517 shown in FIG. 6), and through locking pin slot 563 of locking pin fork 560. Locking pin 570 may also rest against lower peripheral portion 542 of cam 530. As seen in FIGS. 5 and 6, locking pin 570 may have caps at one or both ends to prevent locking pin 570 from sliding out of one or both of the housing slots.

With switch 406 fastened to opening 528 of housing 500, a plunger 407 of switch 406 may engage peripheral end portion 550 of cam 530. In the exemplary embodiment, switch 406 is shown as a cross-roller plunger limit switch. In particular, plunger 407 comprises a roller that rolls along the profile of cam 530 and may be pressed/pushed down (towards a base 409 of switch 406). However, in other embodiments, any other suitable switch may be used.

Figure 9C:
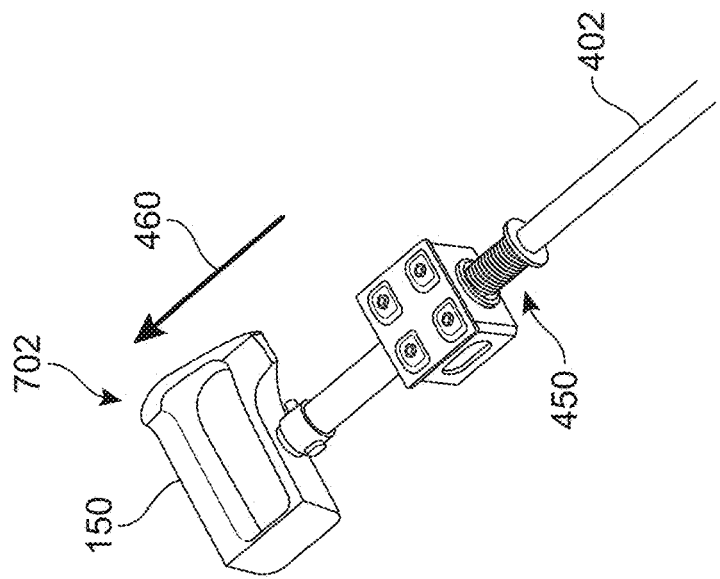
FIGS. 9A-C depict views of a handle in three different positions, according to an embodiment.
Figure 9B:
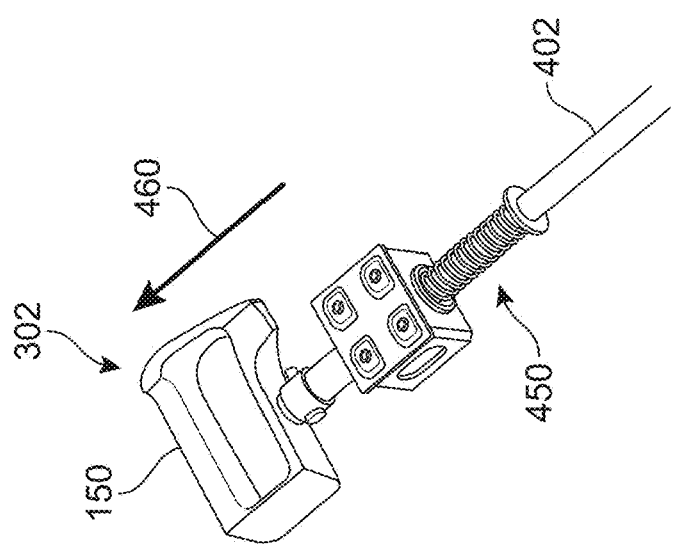
Figure 9A:
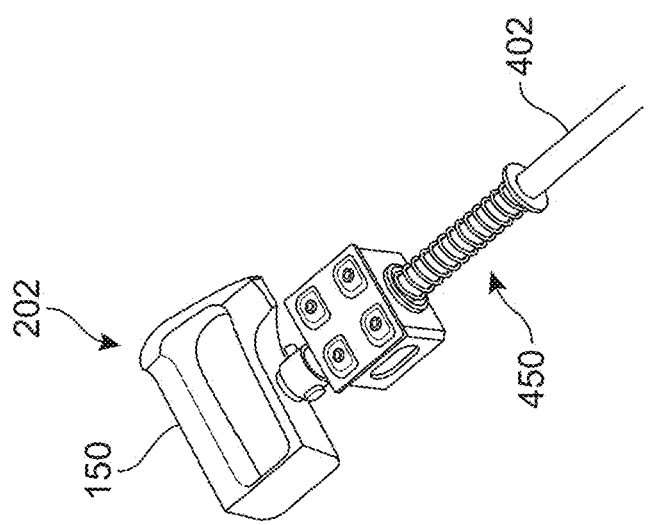

As discussed, rotary toggle mechanism 404 is configured to operate in three different positions, each of which is associated with a different linear position of handle 150 (and the associated lever 402). FIGS. 9A-C depict views of handle 150 in three different positions. Specifically, in FIG. 9A, handle 150 is shown in a retracted position 202. In FIG. 9B, handle 150 is shown in an extended position 302. Finally, in FIG. 9C, handle 150 is shown in a second extended position 702. As seen by comparing FIGS. 9B and 9C, second extended position 702 extends further along first linear direction 460 than (first) extended position 302. Each of these positions for handle 150 may be associated with a different operating state or configuration of rotary toggle mechanism 404.

Figure 10A:
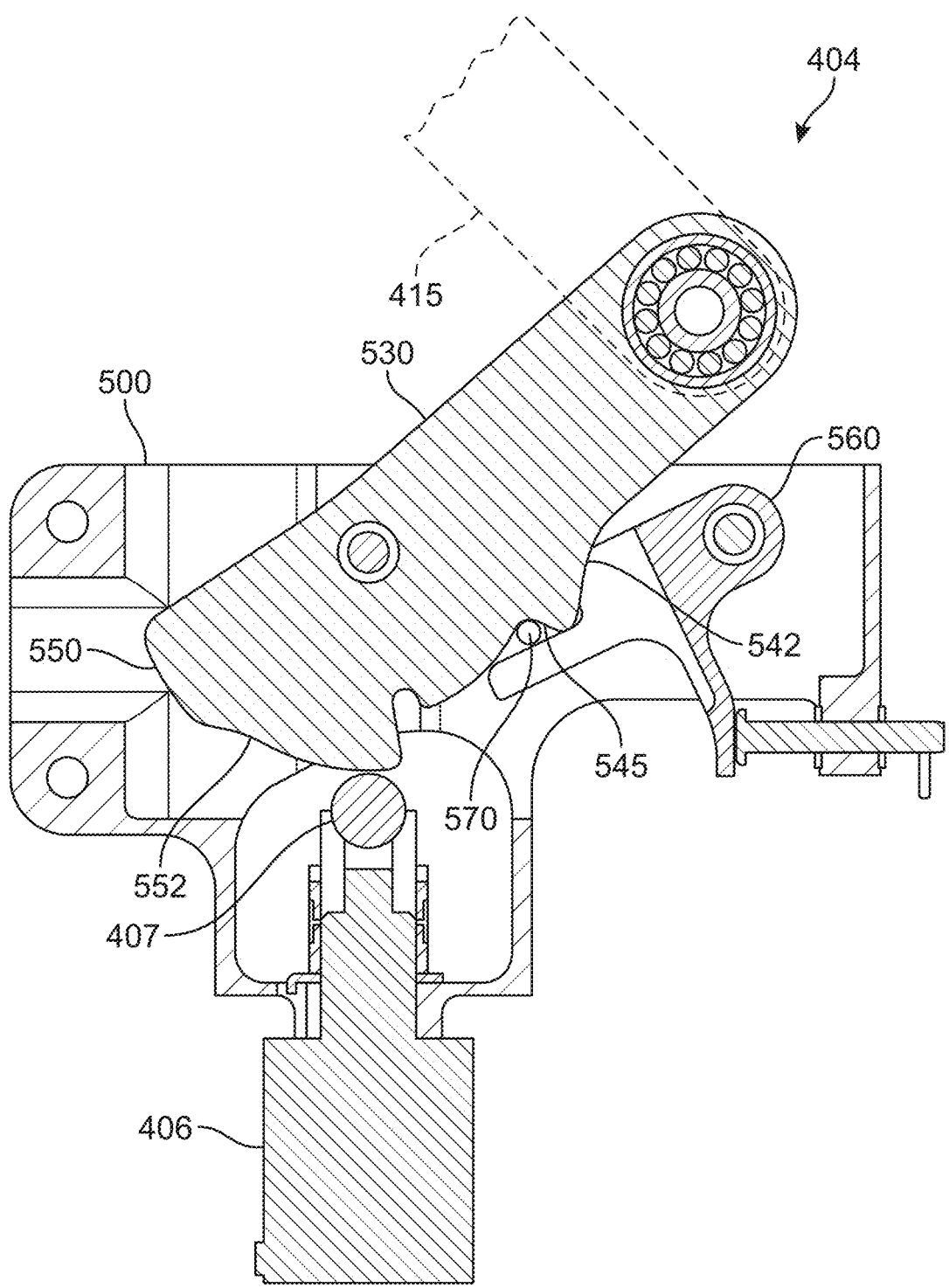
FIGS. 10A-C are schematic views depicting the three different states of a rotary toggle mechanism, according to an embodiment.
Figure 10B:
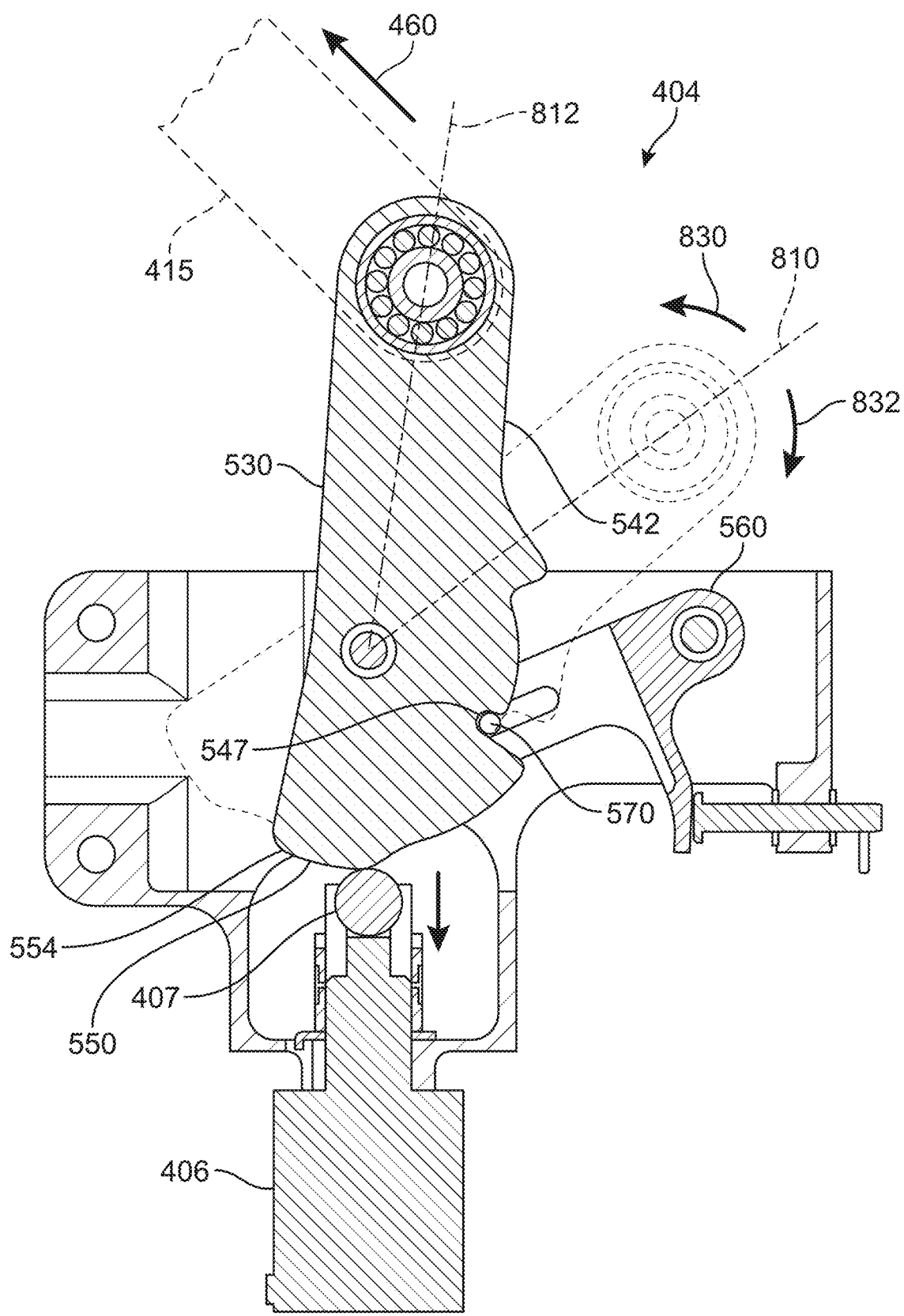
Figure 10C:
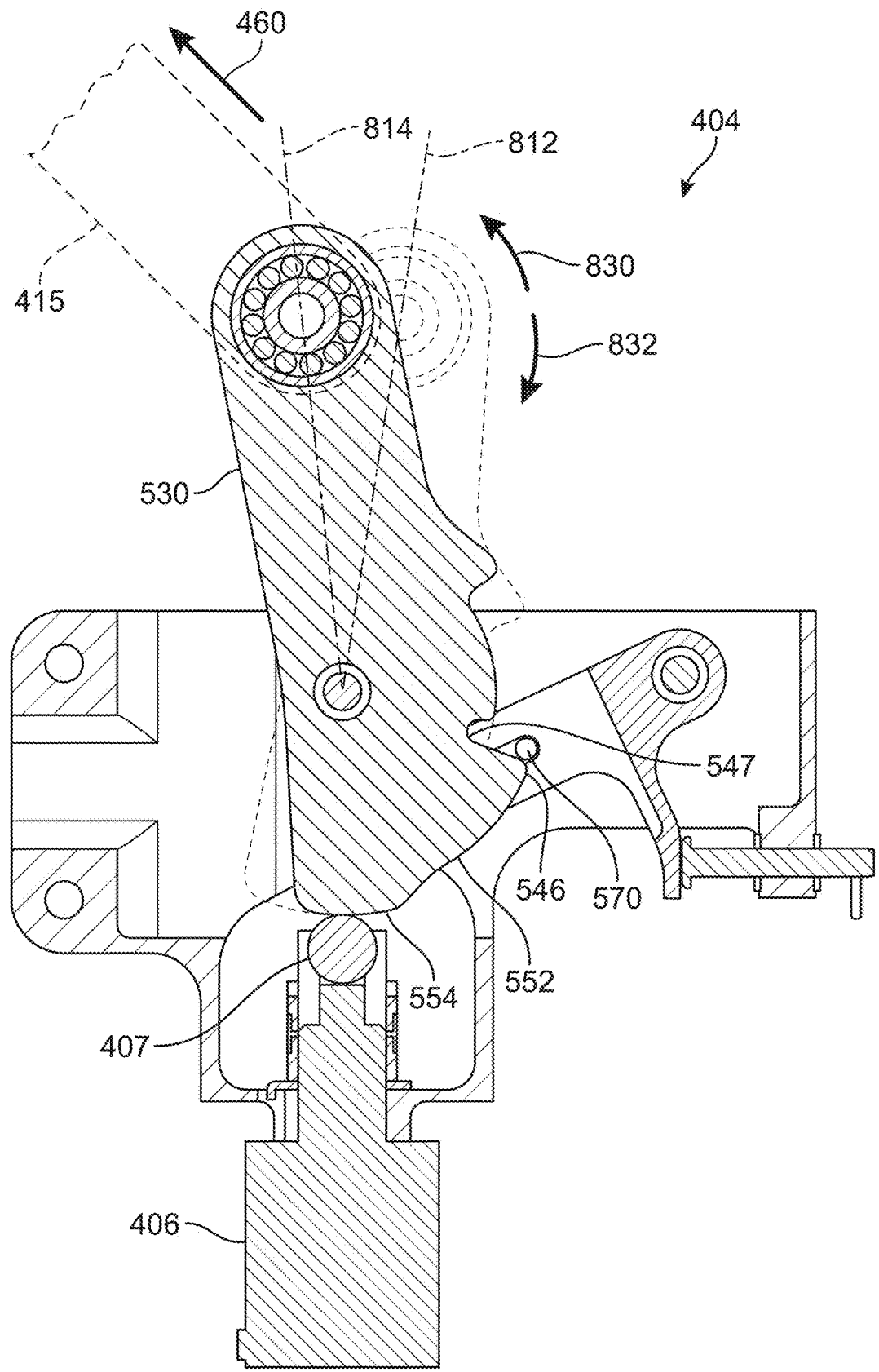

FIGS. 10A-10C are schematic views depicting the three different states of rotary toggle mechanism 404, including a start or ready state (FIG. 10A), an active state (FIG. 10B), and a reset state (FIG. 10C). Moreover, each of these states may be associated with one of the handle positions shown in FIGS. 9A-9C. In particular, retracted position 202 of handle 150 shown in FIG. 9A corresponds to the ready state of mechanism 404 shown in FIG. 10A. First extended position 302 of handle 150 shown in FIG. 9B corresponds to the active state of mechanism 404 shown in FIG. 10B. Second extended position 702 shown in FIG. 9C corresponds to the reset state of mechanism 404 shown in FIG. 10C.

Referring first to FIG. 10A, rotary toggle mechanism 404 is configured in the ready state. In this state, locking pin 570 is secured between cam 530 and the housing slots (see slot 517 of FIG. 6). In particular, locking pin 570 is disposed in the main slot portions of the housing slots (such as main slot portion 518 of first housing slot 517). Locking pin 570 may also be disposed at recessed portion 545 of lower peripheral portion 542 of cam 530. In this ready state, first portion 552 of peripheral end portion 550 is disposed against plunger 407, but does not press sufficiently against the biasing force of switch 406 to press plunger 407 down. With switch 406 in the default (non-activated) position, the emergency landing gear system is not engaged.

Referring next to FIG. 10B, rotary toggle mechanism 404 is configured in the active state. The active state is reached by pulling handle 150 in first linear direction 460, which also pulls lever 402 and linkage 415 in this same direction. As linkage 415 is pulled, linkage 415 rotates cam 530 in a first rotational direction 830 from a first angular position 810 to a second angular position 812. During this rotation plunger 407 follows first portion 552 of peripheral end portion 550 and transitions to second portion 554. Due to the geometry of second portion 554, plunger 407 is pressed downward as cam 530 continues to rotate to the second angular position 812. Because plunger 407 is actuated in this active state, the emergency landing gear system is engaged.

As cam 530 is rotated from a first angular position 810 to a second angular position 812, locking pin 570 moves along lower peripheral portion 542 of cam 530, until locking pin 570 is drive into detent 547 of cam 530 by locking pin fork 560. With locking pin 570 in detent 547 of cam 530, rotational movement of cam 530 in the opposing second rotational direction 832 is prevented. Therefore, in this active state, cam 530 cannot return directly to the ready state, which would deactivate the emergency landing gear system.

Because rotary toggle mechanism 404 locks rotation in the return direction (that is, in second rotational direction 832) while in the active state, the mechanism must be further rotated in the same direction used to place the mechanism in the active state to unlock rotation in the return direction. That is, the mechanism must be further rotated in the first rotational direction 830 before it can be rotated in the second rotational direction 832 when moving from the active state.

Figure 11:
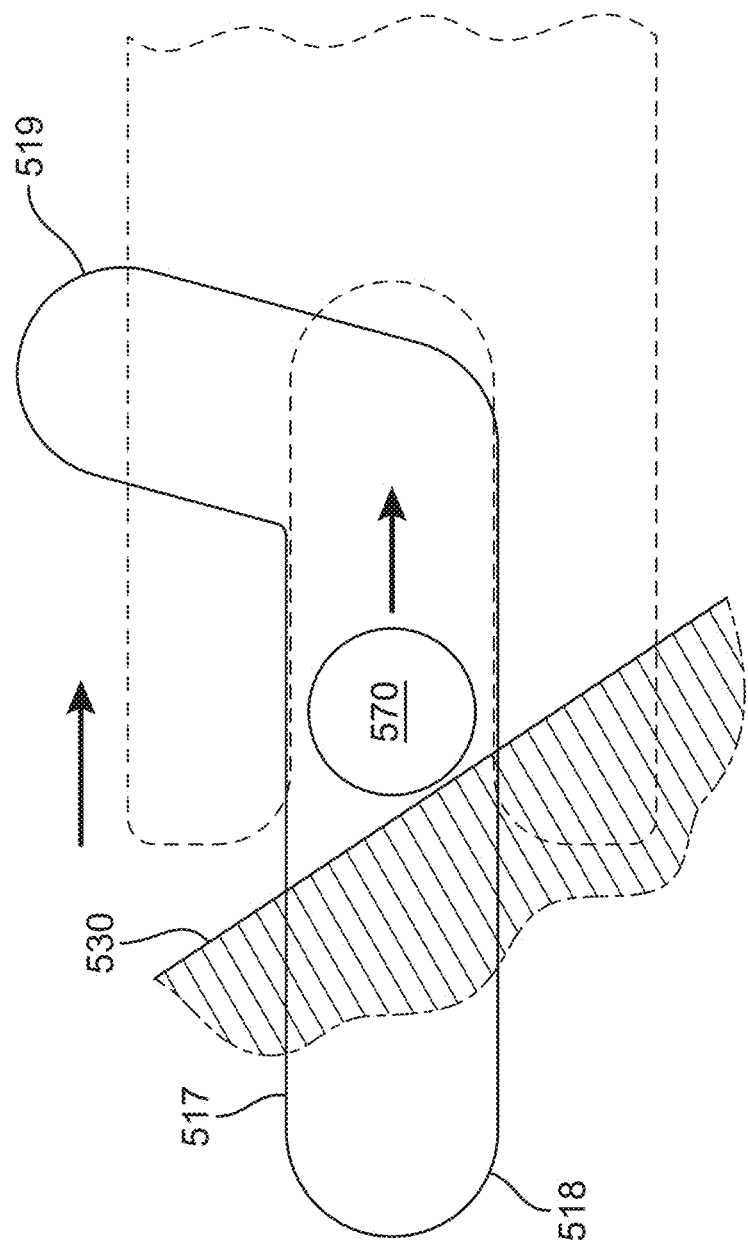
FIGS. 11-13 are schematic views showing a locking pin driven into different portions of a housing slot, according to an embodiment.
Figure 12:
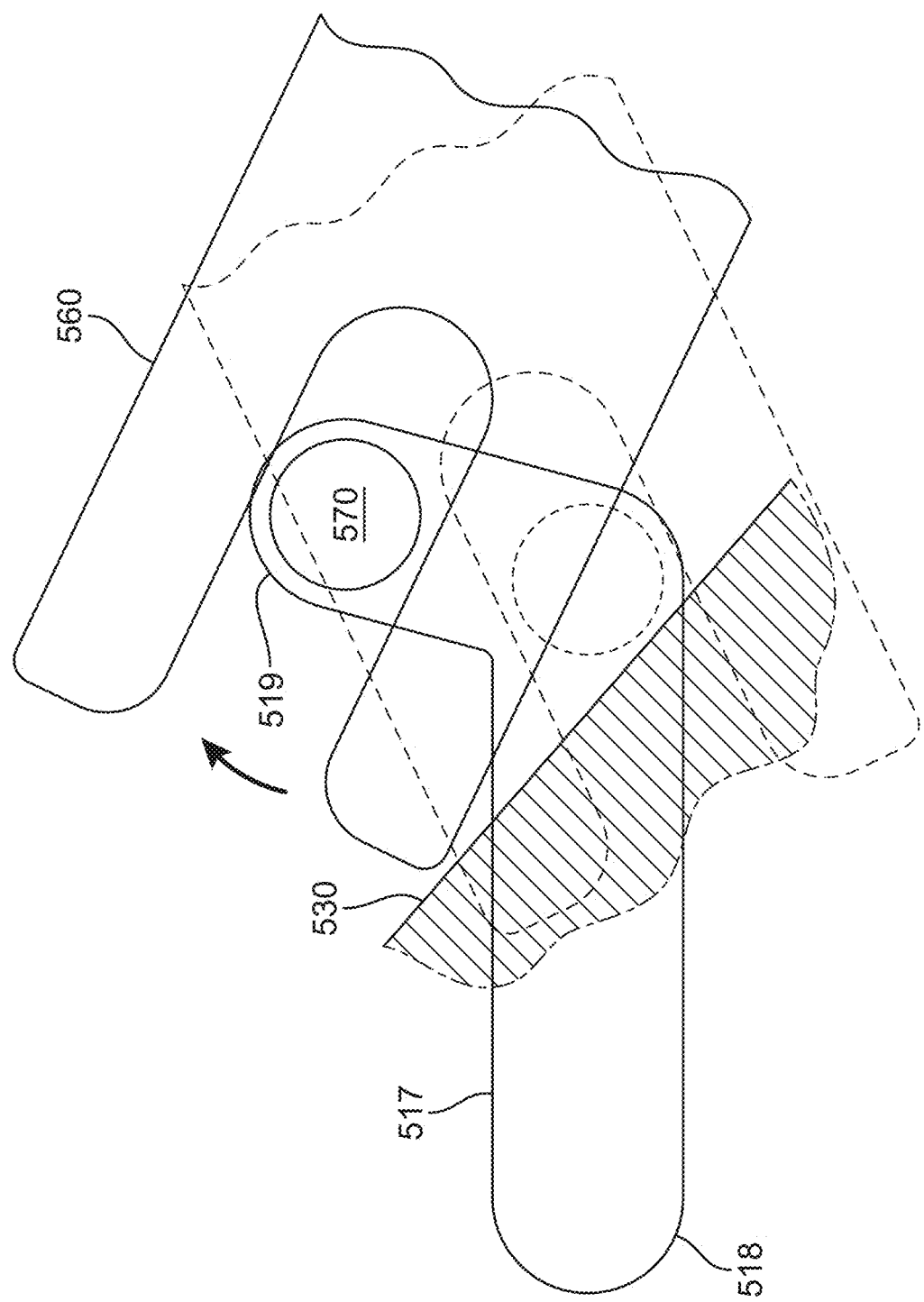

FIG. 10C shows rotary toggle mechanism 404 in the reset state. To place rotary toggle mechanism 404 in the reset state, a pilot pulls handle 150 further outwards (and into the cockpit), which rotates cam 530 further in the first rotational direction 830. As cam 530 is rotated from second angular position 812 to a third angular position 814 (which motion may be referred to as the reset stroke), locking pin 570 escapes detent 547 and travels along (or against) second protruding portion 546 of cam 530. Cam 530 pushes locking pin 570 along the main portions of the housing slots. For example, as shown schematically in FIG. 11, locking pin 570 is driven by cam 530 through main slot portion 518 of first housing slot 517. As locking pin 570 reaches the ends of the housing slots, locking pin fork 560 pushes locking pin 570 up into the detents of the housing slots. For example, locking pin 570 is pushed up into detent 519 of first housing slot 517, as shown schematically in FIG. 12. While locking pin 570 is in the detents of the housing slots, locking pin 570 may be disengaged with cam 530, thereby allowed cam 530 to rotate freely in the second rotational direction 832.

It may be appreciated that while the ready state and the active state may be maintained for significant periods of time, the reset state is maintained only briefly as cam 530 moves through the reset stroke and is then free to rotate back in the second rotational direction 832. Therefore, both the reset state of mechanism 404 depicted in FIG. 10C, and the corresponding second extended position 702 of handle 150 shown in FIG. 9C, may only be maintained for as long as a pilot (or co-pilot) continues to apply a sufficient pulling force on handle 150. As soon as this force is released (or reduced sufficiently), spring 450 of assembly 400 may cause handle 150 to retract (and likewise, cause cam 530 to rotate back towards the ready state).

Figure 13:
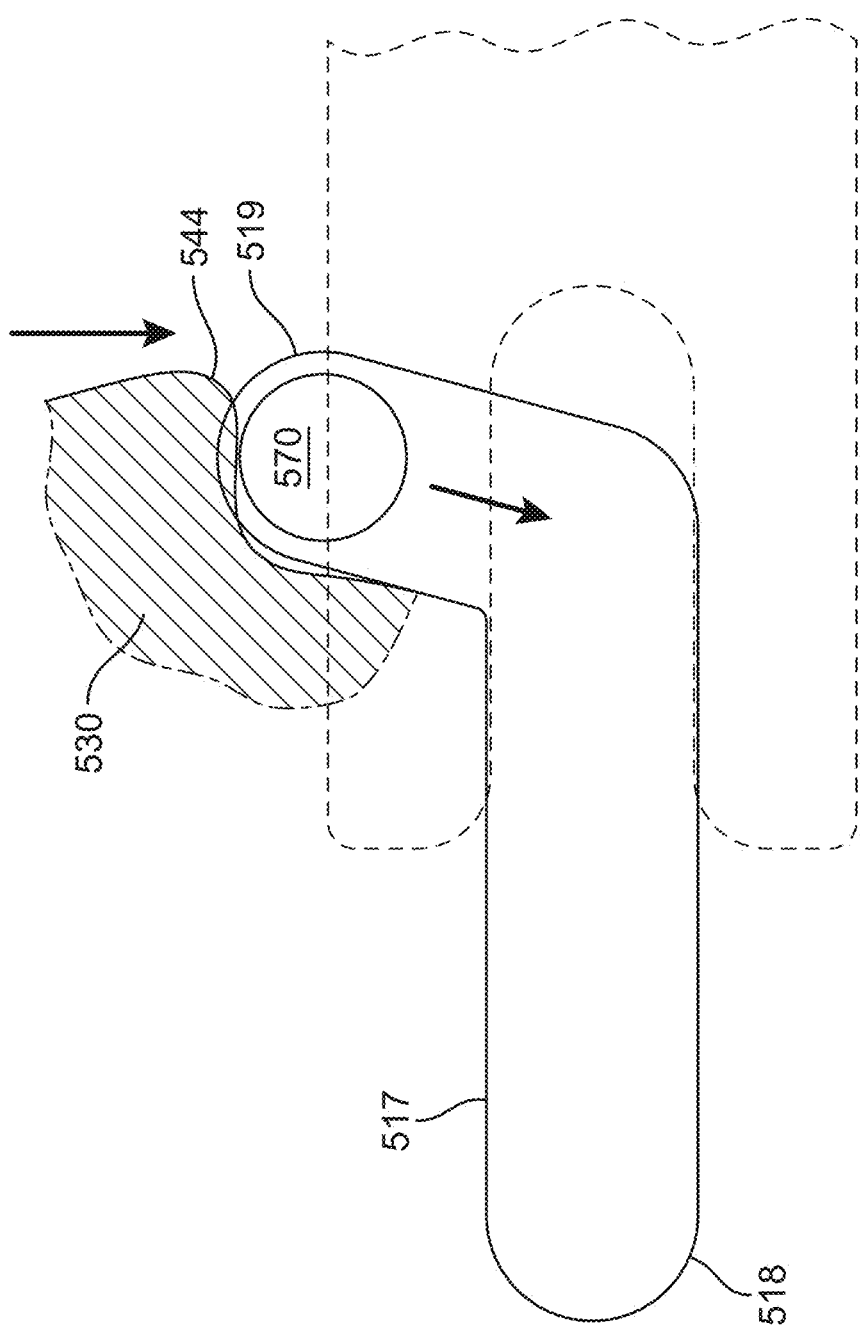

With locking pin 570 retained within the detents of the housing slots, and the pulling force applied by the pilot to handle 150 released, cam 530 may be rotated in the second rotational direction 832, towards the ready state. Moreover, as cam 530 is rotated back towards the ready state, first protruding portion 544 may contact locking pin 570 and drive locking pin 570 out of the detents of the housing slots and into the main slot portions. For example, locking pin 570 may be pushed out of detent 519 by first protruding portion 544 as cam 530 rotates in the second rotational directional, as shown in FIG. 13.

When cam 530 is rotated back to the ready state, following the reset stroke, plunger 407 is raised as it makes contact with first portion 552 of peripheral end portion 550 once again. At this point the free-fall system is disengaged.

It may be appreciated that various components of the embodiments may be adjusted to accommodate different operational requirements. For example, the specific sizing of springs and detents may be chosen to obtain a preferred mechanical feedback of the active and reset states.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. A rotary toggle mechanism, comprising:
   a housing including a housing slot with a main slot portion and a slot detent;
   a cam secured to the housing such that the cam is rotatable direction relative to the housing in a first rotational direction and a second rotational direction opposite the first rotational direction, the cam including a cam detent;
   a locking pin extending through the housing slot;
   wherein the rotary toggle mechanism has a first state where the locking pin is secured between the cam and the main slot portion of the housing slot;
   wherein the rotary toggle mechanism has a second state where the locking pin is disposed in the cam detent, wherein the second state is reached by rotating the cam in the first rotational direction from the first state, and wherein the cam is prevented from rotating in the second rotational direction while the rotary toggle mechanism is in the second state;
   wherein the rotary toggle mechanism has a third state where the locking pin is disposed in the slot detent, wherein the third state is reached by rotating the cam in the first rotational direction from the second state, and wherein the cam is rotated in the second rotational direction from the third state to the first state.

2. The rotary toggle mechanism according to claim 1, wherein the housing comprises a first sidewall and a second sidewall and wherein the housing slot is disposed in the first sidewall.

3. The rotary toggle mechanism according to claim 2, wherein a second housing slot is disposed in the second sidewall, and wherein the locking pin also extends through the second housing slot.

4. The rotary toggle mechanism according to claim 1, wherein the cam has a first angular position in the first state, a second angular position in the second state and a third angular position in the third state, and wherein the cam includes a protrusion configured to engage the locking pin and push the locking pin out of the slot detent as the cam is rotated in the second rotational direction from the third angular position to the first angular position.

5. The rotary toggle mechanism according to claim 1, wherein:
   the cam is configured to engage a switch with a plunger;
   wherein the cam includes a first peripheral portion in contact with the plunger when the rotary toggle mechanism is in the first state;
   wherein the cam includes a second peripheral portion in contact with the plunger when the rotary toggle mechanism is in the second state;
   wherein the plunger is not pressed down by the first peripheral portion; and
   wherein the plunger is pressed down by the second peripheral portion.

6. The rotary toggle mechanism according to claim 1, wherein the housing includes an opening for mounting a switch with a plunger.

7. The rotary toggle mechanism according to claim 1, wherein the rotary toggle mechanism further includes:
   a locking pin fork secured to the housing such that the locking pin fork is rotatable in the first rotational direction and in the second rotational direction, the locking pin fork including a locking fork slot for receiving the locking pin; and
   a spring pin assembly comprising a spring and a spring pin for retaining the spring, wherein the spring pin assembly contacts the locking pin fork and biases the locking pin fork in the second rotational direction.

8. The rotary toggle mechanism according to claim 7, wherein the locking pin fork drives the locking pin into the cam detent as the rotary toggle mechanism transitions from the first state to the second state.

9. The rotary toggle mechanism according to claim 8, wherein the locking pin fork drives the locking pin into the slot detent as the rotary toggle mechanism transitions from the second state to the third state.

10. An assembly, comprising:
    a lever comprising a first end and a second end;
    a handle attached to the first end of the lever;
    a rotary toggle mechanism associated with the second end of the lever;
    wherein the rotary toggle mechanism has three different states corresponding to three different positions of the handle; and wherein the rotary toggle mechanism further includes:
      a housing including a housing slot with a main slot portion and a slot detent;
      a cam secured to the housing such that the cam is rotatable direction relative to the housing in a first rotational direction and a second rotational direction opposite the first rotational direction, the cam including a cam detent;
      a locking pin extending through the housing slot;
      wherein the rotary toggle mechanism has a first state where the locking pin is secured between the cam and the main slot portion of the housing slot;
      wherein the rotary toggle mechanism has a second state where the locking pin is disposed in the cam detent, wherein the second state is reached by rotating the cam in the first rotational direction from the first state, and wherein the cam is prevented from rotating in the second rotational direction while the rotary toggle mechanism is in the second state;
      wherein the rotary toggle mechanism has a third state where the locking pin is disposed in the slot detent, wherein the third state is reached by rotating the cam in the first rotational direction from the second state, and wherein the cam is rotated in the second rotational direction from the third state to the first state.

11. The assembly according to claim 10, wherein translation of the lever along an axis parallel with a length of the lever switches the rotary toggle mechanism between the three different states.

12. The assembly according to claim 10, wherein the assembly is configured for use in an emergency landing gear system in an aircraft.

13. The assembly according to claim 10, wherein a linkage connects the second end of the lever with an end of the cam, and wherein the cam rotates with respect to the linkage.

14. The assembly according to claim 10, wherein moving the rotary toggle mechanism from the first state to the second state requires pulling the handle in a first linear direction.

15. The assembly according to claim 14, wherein moving the rotary toggle mechanism from the second state to the third state requires pulling the handle in the first linear direction.

16. The assembly according to claim 14, wherein the handle translates in a second linear direction opposite the first linear direction as the rotary toggle mechanism moves from the third state back to the first state.

17. A system for controlling an emergency landing gear system in an aircraft, the system comprising:
- a switch having an actuated position in which the emergency landing gear system is activated and a non-actuated position in which the emergency landing gear system is deactivated;
- a rotary toggle mechanism for changing the switch between the actuated position and the non-actuated position;
- a lever for controlling the rotary toggle mechanism; and
- a handle connected to the lever, wherein the handle is configured to be accessible by a pilot of the aircraft; and
wherein the rotary toggle mechanism further includes:
  - a housing including a housing slot with a main slot portion and a slot detent;
  - a cam secured to the housing such that the cam is rotatable in a first rotational direction and a second rotational direction opposite the first rotational direction relative to the housing, the cam including a cam detent;
  - a locking pin extending through the housing slot;
  - wherein the rotary toggle mechanism has a first state where the locking pin is secured between the cam and the main slot portion of the housing slot;
  - wherein the rotary toggle mechanism has a second state where the locking pin is disposed in the cam detent, wherein the second state is reached by rotating the cam in the first rotational direction from the first state, and wherein the cam is prevented from rotating in the second rotational direction while the rotary toggle mechanism is in the second state;
  - wherein the rotary toggle mechanism has a third state where the locking pin is disposed in the slot detent, wherein the third state is reached by rotating the cam in the first rotational direction from the second state, and wherein the cam is rotatable in the second rotational direction while the rotary toggle mechanism is in the third state.

18. The system according to claim 17, wherein pulling the handle from a first position to a second position moves the rotary toggle mechanism from a first state to a second state, wherein the switch has the non-actuated position when the rotary toggle mechanism is in the first state and wherein the switch has the actuated position when the rotary toggle mechanism is in the second state.

19. The system according to claim 18, wherein the handle is locked in the second position while the rotary toggle mechanism is in the second state.

20. The system according to claim 17, wherein the switch includes a plunger configured to engage the cam.

* * * * *